June 2, 1970     K. J. JONES ET AL     3,515,365

REARVIEW MIRROR HAVING RESILIENT CONNECTOR

Filed April 11, 1968     4 Sheets-Sheet 1

INVENTOR
K. J. Jones
A. L. Baker
BY Mason, Downing
& Sutra
ATTORNEYS

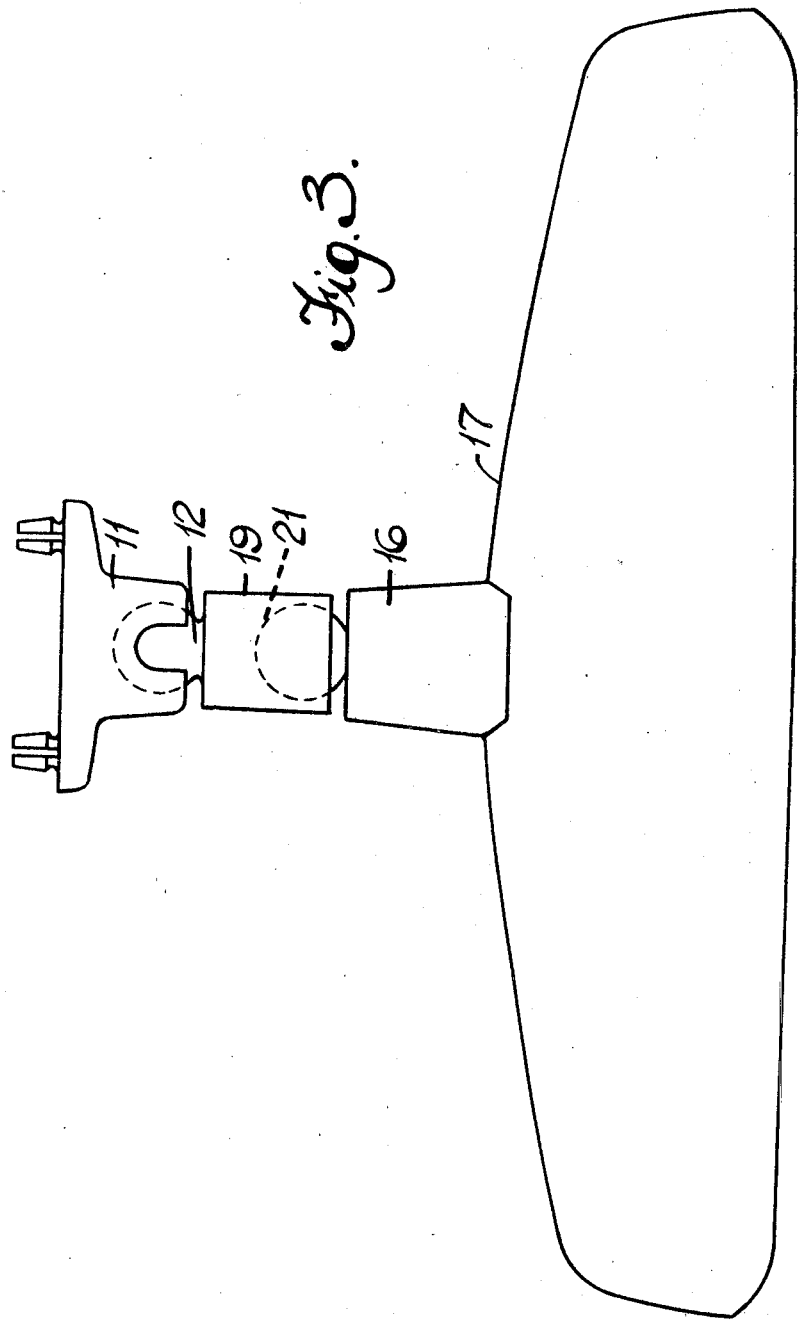

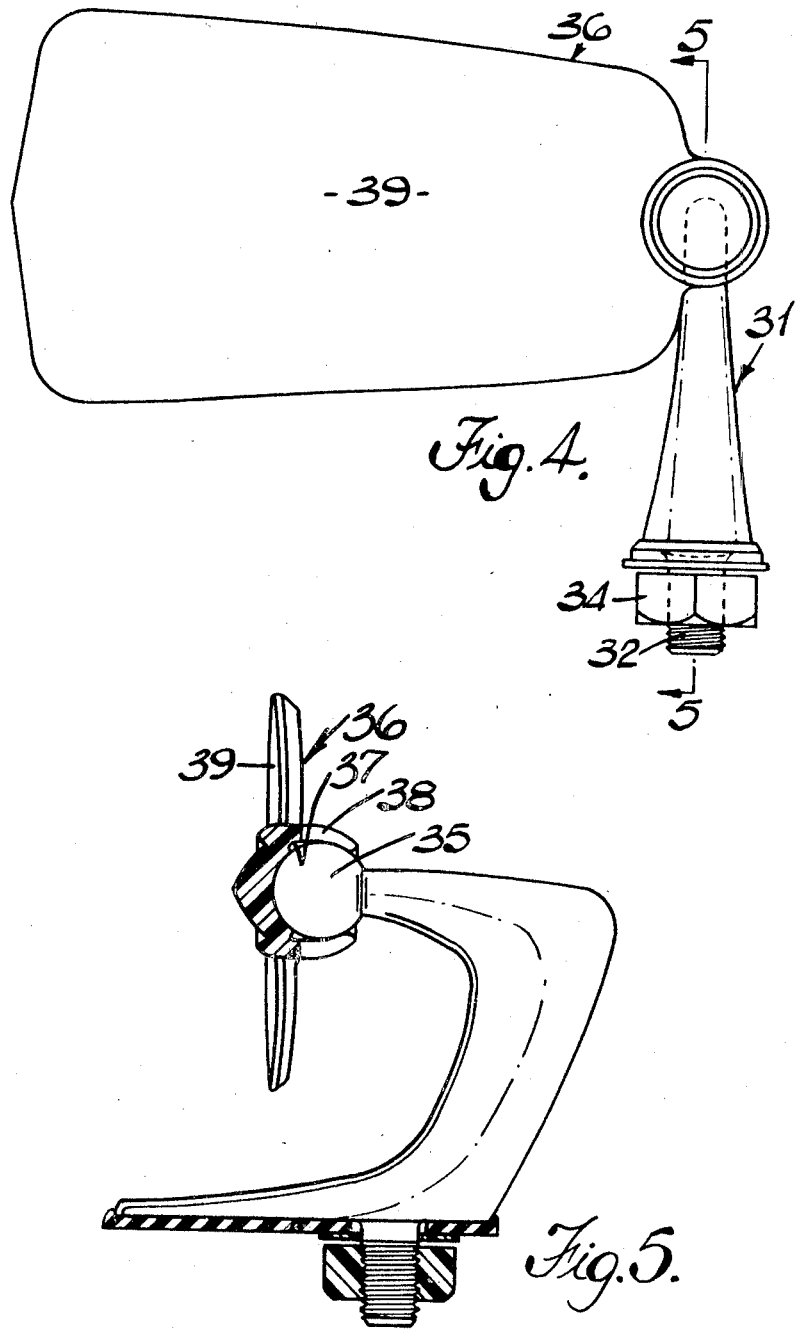

United States Patent Office 3,515,365
Patented June 2, 1970

3,515,365
REARVIEW MIRROR HAVING RESILIENT
CONNECTOR
Kenneth James Jones, Sutton Coldfield, and Alfred
Dickens Baker, Solihull, England, assignors to
Joseph Lucas (Industries) Limited, Birmingham,
England
Filed Apr. 11, 1968, Ser. No. 720,516
Claims priority, application Great Britain, May 5, 1967,
20,996/67
Int. Cl. B60r 1/06
U.S. Cl. 248—481                                    1 Claim

ABSTRACT OF THE DISCLOSURE

A rearview has a plate like reflecting portion which is formed with an aperture. A resilient connecting member fits within the aperture and has an external groove which receives the wall of the aperture, and has a part spherical recess which receives the mating spherical portion of the support bracket. When the resilient connecting member is engaged with the bracket, the walls of the aperture are deformed and grip the reflecting plate. All parts can be molded in synthetic resin, and the reflecting portion can be flat or convex and chromium plated. Other embodiments of ball and socket connectors are disclosed.

This invention relates to rearview mirrors for road vehicles.

A rearview mirror according to the invention includes a first part moulded in synthetic resin and adapted to be secured to the body of a road vehicle, and a second part also moulded in synthetic resin and carried by the first part, said second part including a surface which is plated to constitute a mirror.

Figure 1:
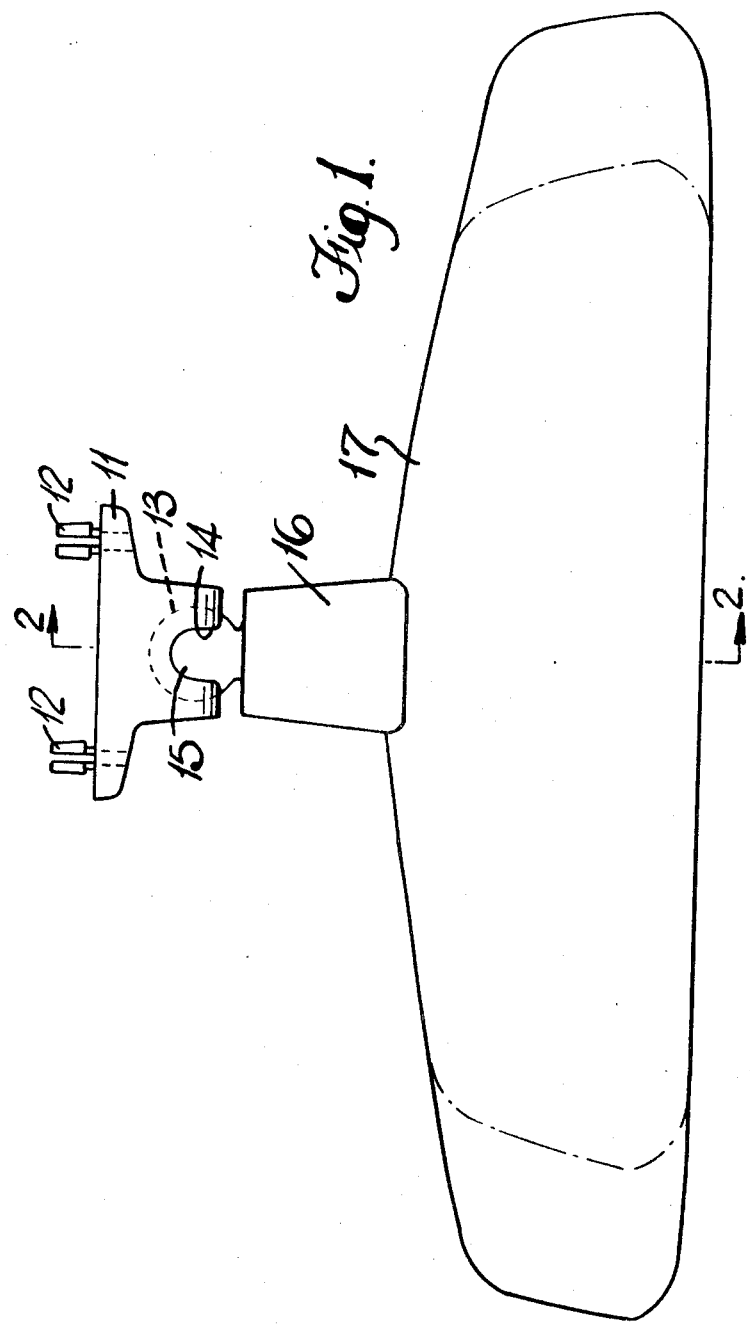
Figure 2:
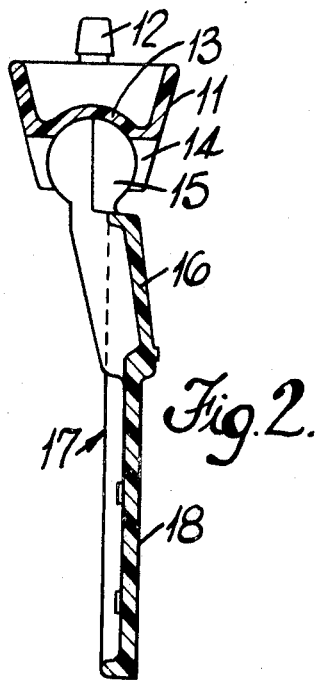
Figure 6:
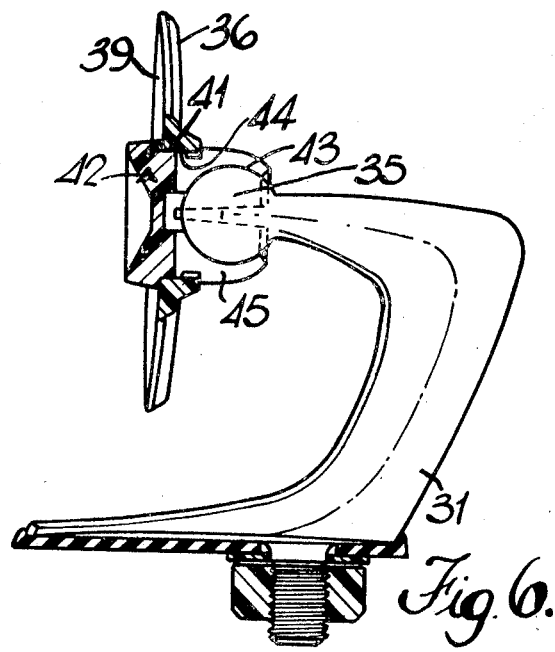

In the accompanying drawings:

FIG. 1 is a front elevational view of a first example of a rear view mirror, for a road vehicle according to the invention, FIG. 2 is a sectional view on the line 2—2 in FIG. 1, FIG. 3 is a view similar to FIG. 1 illustrating a modification, FIG. 4 is a front elevational view of a second example of a rear view mirror according to the invention, FIG. 5 is a sectional view on the line 5—5 in FIG. 4 and FIG. 6 is a sectional view of a third example of a rear view mirror according to the invention.

Referring first to FIGS. 1 and 2 there is provided an interior rear view mirror including a support 11 moulded in synthetic resin and having upstanding therefrom a pair of bifurcated resilient posts 12. The posts 12 are shaped to define barbs so that when the posts are inserted through holes in a panel of a road vehicle the barbs will engage with side of the panel remote from the support 11, to retain the support in position on the panel. The portion of the support 11 remote from the posts 12 is formed with a part spherical recess 13 having a pair of diametrically opposite slots 14 in the wall thereof.

There is further provided a moulded synthetic resin spherical member 15 which is engageable with the recess 13 as a snap fit by virtue of the resilience of the wall of the recess. Integral with the member 15 is an arm 16 which carries at its end remote from the member 15 an integral plate like member 17. The member 17 is so moulded that one surface 18 thereof has thereon a specular finish. The member 17 and the arm 16 are chromium plated and the finish of the surface 18 of the member 17 is such that after the plating operation the surface 18 is highly reflective and constitutes a mirror.

The other surfaces of the member 17 and the arm 16 are broken so that after plating a decorative finish is produced thereon.

It will be appreciated that the engagement of the member 15 in the recess 13 constitutes a ball and socket connection between the support 11 and the arm 16 so that the mirror surface 18 can be positioned as required by a driver, the resilience of the wall of the recess 13 ensuring that the member 15 is gripped sufficiently tightly to retain the arm 16 and the member 17 in the set position.

In the modification shown in FIG. 3 there is provided an extension piece 19 which is also moulded in synthetic resin. The ends of the piece 19 are shaped to define a recess 21 similar to the recess 13 and a spherical member 22 similar to the member 15, respectively. The piece 19 is inserted between the arm 16 and the support 11, the member 22 being engaged with the recess 13 and the recess 21 having engaged therein the member 15.

Referring now to FIGS. 4 and 5 there is provided an exterior rearview mirror including a generally C shaped moulded synthetic resin support 31. Formed integrally with the lower limb of the support 31 is a screw threaded spigot 32 which is inserted through a hole in a panel 33 of the road vehicle body and which has engaged therewith a nut 34 which engages the face of the panel 33 remote from the support 31 to the panel 33. The upper limb of the support 31 is formed at its free end with an integral spherical member 35. The mirror further includes a moulded synthetic resin plate like member 36 one end of which is moulded to define a part spherical recess 37. The wall of the recess 37 is provided with a pair of diametrically opposed slots 38 and by virtue of the resilience of the wall of the recess 37 the spherical member 35 of the support 31 can be engaged as a snap fit in the recess 37.

The member 36 is so moulded that one surface 39 thereof has thereon a specular finish. The member 36 with the exception of the recess 37 is chromium plated and the finish of the surface 39 is such that after the plating operation the surface 39 is highly reflective and constitutes a mirror. The other surfaces of the member 36 are broken so that a decorative finish is produced thereon after the plating operation.

The ball and socket connection between the support 31 and the member 36 is similar to that between the support 11 and the arm 16 of the interior mirror in the first example, and moreover it will be appreciated that the support 31 could be provided with barbed, bifurcated, resilient posts, in place of the spigot 31, for mounting the support 31 on the road vehicle body.

It will be appreciated that the surfaces 18, 39 can be flat or convex.

In the example shown in FIG. 6 the support member 31 is identical with the support member 31 in FIGS. 4 and 5. However, the plate like portion 36 differs from that shown in FIGS. 4 and 5 in that instead of having the recess for receiving the spherical member 35 of the support member 31 formed in a part integral with the portion 36, the portion 36 is formed with a hole 41. Engageable in the hole 41 is a generally cylindrical moulded synthetic resin connector 42. At one end the connector 42 is formed with a part spherical recess 43 and between its ends the connector 42 is provided with a circumferential groove 44 the width of which is substantially the same as the thickness of the portion 36. The wall of the recess 43 is formed with four equiangularly spaced axial slots 45.

In order to assemble the mirror, the connector 42 is inserted into the hole 41 in the portion 36 and by virtue of the resilience of the wall of the recess 43 the connector can be snapped into engagement with the portion 36, the portion 36 being engaged in the groove 44 of the connector 42 with the end of the connector 42 which defines the recess 43 projecting from the face of the portion 36 remote from the mirror surface.

The spherical member 35 of the support member 31 is then snapped into engagement with the recess 43 to interengage the portion 36 and the member 31. When the spherical member 35 is engaged in the recess 43 the wall of the recess will be deformed outwardly and there will therefore be a tendency for the groove 44 to become narrower and so the portion 36 will be gripped between the walls of the groove and thereby maintained in position relative to the connector 42. The recess 43 and the member 35 constitute a ball and socket joint between the portion 36 and the member 31.

It will be appreciated that the principle of interconnecting first and second parts through a third part in such a manner that the engagement of the second part with the third part deforms the third part to grip the first part is not limited to the mirror described but is useful in a wide variety of other mirrors.

Having thus described our invention what we claim as new and desire to secure by Letters Patent is:

1. A rearview mirror for a road vehicle comprising in combination, a support bracket adapted at one end to be secured to the body of a road vehicle, and having a spherical member at its other end, a plate like member carrying the reflective surface of the mirror and formed with an aperture, and a resilient connecting part having an external circumferentially extending groove within which the wall of the aperture in the plate like member is engaged, the connecting part further having a part spherical recess therein, within which the spherical member of the support bracket is engaged, the engagement of the spherical member of the support bracket in the part spherical recess in the connecting part acting to distort the connecting part so that the width of the external groove in the connecting part is reduced and the plate like member is gripped, and thereby retained in position by the connecting part.

References Cited

FOREIGN PATENTS

| 1,122,172 | 5/1956 | France. |
| 1,246,937 | 10/1960 | France. |
| 736,382 | 9/1955 | Great Britain. |
| 882,313 | 11/1961 | Great Britain. |
| 909,769 | 11/1962 | Great Britain. |

DAVID SCHONBERG, Primary Examiner

J. W. LEONARD, Assistant Examiner

U.S. Cl. X.R.

24—213; 248—484; 350—288